June 9, 1925.  J. J. QUERTINMONT  1,541,772
GLASS FURNACE
Filed Feb. 7, 1925
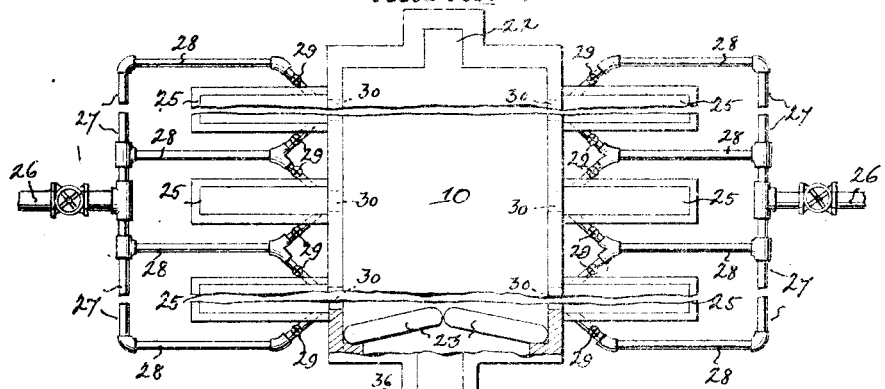
Fig. 1
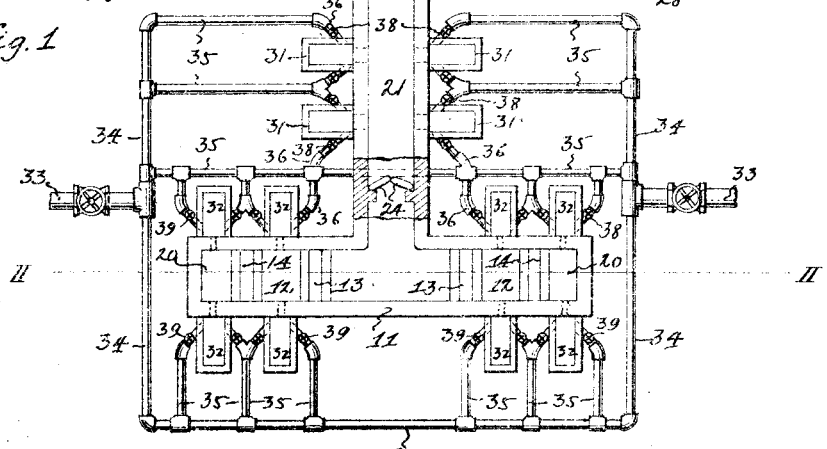
Fig. 2
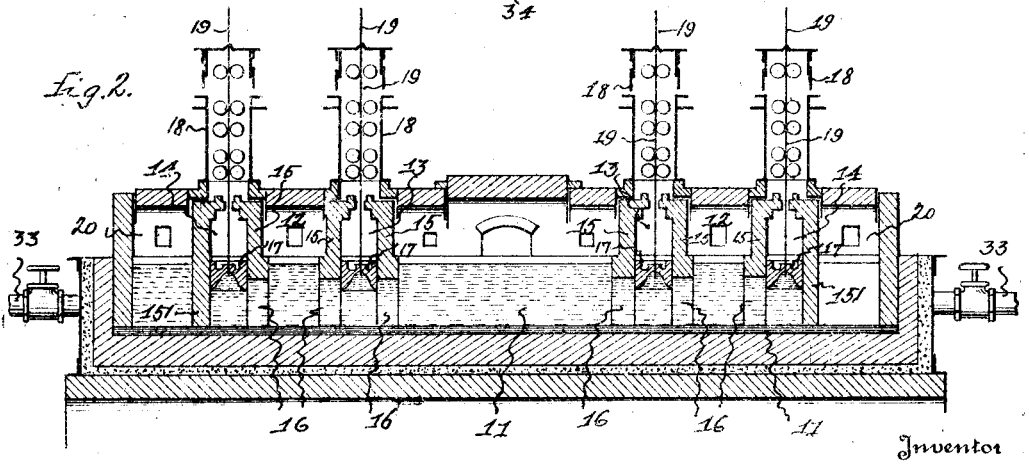
Inventor
Jules J. Quertinmont
By
Attorney Patented June 9, 1925.

1,541,772

UNITED STATES PATENT OFFICE.

JULES J. QUERTINMONT, OF POINT MARION, PENNSYLVANIA.

GLASS FURNACE.

Application filed February 7, 1925. Serial No. 7,600.

*To all whom it may concern:*

Be it known that I, JULES J. QUERTINMONT, a citizen of the United States, residing at Point Marion, in the county of Fayette and State of Pennsylvania, have invented certain new and useful Improvements in Glass Furnaces, of which the following is a specification.

This invention relates to improvements in glass furnaces, which are particularly adapted to constantly and uniformly supply molten glass of a homogeneous texture and fluidity to a series or battery of mechanical continuous sheet glass drawing machines.

In prior glass furnaces used in conjunction with a battery or series of sheet glass drawing machines as shown for example in U. S. patent to Fourcault, No. 837,821, dated Dec. 4, 1906, the sheets of glass usually drawn from the last or two last drawing machines are at times a total loss due to much breakage and inferior grade of glass caused by the inequality of temperature and lack of uniform texture of the molten glass at each side of and passing into the floater or "debiteuse" used in conjunction with the drawing machines operating in the said last drawing chambers. This defective operation of the last drawing machines has been found to be due, first, that as the molten glass flows from the melting furnace through the several drawing and reheating chambers its lower strata is not directly heated by the reheating gases in the reheating chambers, and secondly, said lower strata moves more slowly than its top or intermediate portions or strata and hence cools more rapidly, and in passing through the reheating chambers said lower strata cannot be reheated without unnecessarily and dangerously increasing the temperature and destroying the proper drawing qualities of the top strata or portion of the molten glass flowing directly into the floater or "debiteuse", and as the lowest portion or strata of the moving molten and slightly chilled glass arrives at the last drawing chamber and its movement is checked and cooled by the outer wall of the last drawing chamber, said chilled glass mixes with the hotter molten glass of the upper or intermediate strata and consequently destroys the drawing qualities of the molten glass deposited in the last drawing chamber, as will be readily understood. To overcome this defect of prior glass furnaces of the character referred to, an auxiliary or separate and independent heating chamber having no communication with the melting furnace or drawing tank and containing no molten glass has been arranged adjacent to the last drawing chamber or chambers, which heating chamber is provided with a heating wall adjacent to and forming a part of the outer wall of the last drawing chamber, and said heating wall extends from the top to the extreme bottom of the last drawing chamber so as at all times correctly reheat by a controlled temperature and properly revitalize all of the different strata of the chilled molten glass in the last drawing chamber and insure a feeding of molten glass to the last floater or "debiteuse" having the same good drawing qualities as exist in the other and efficient drawing chambers.

The objects of the invention are:

First, to construct and arrange the elements of a glass furnace of the above character which will be simple and compact in construction, cheap to manufacture and maintain in operation, all of the parts readily accessible and easily inspected or repaired, and at the same time occupy a minimum of floor space in proportion to the number of sheet glass drawing machines supplied with molten glass.

Second, to construct a glass furnace capable of supplying a battery of mechanical sheet glass drawing machines in such a manner that the molten glass will at all times be pure and unadulterated, and of such consistency, temperature and fluidity as to be constantly and uniformly flowing or moving towards all the drawing machines without said molten glass vitrifying or assume any other condition which would tend to destroy the constant, proper and efficient operation of all said machines.

Third, to construct a glass furnace having a drawing tank consisting of drawing and reheating chambers alternately arranged and adapted to be used in conjunction with a battery of mechanical continuous sheet glass drawing machines, in which the reheating of the molten glass in the drawing tank after leaving the melting furnace and the first drawing chambers is so arranged and carried out that the texture, temperature and fluidity of the molten glass is preserved to its full depth and on each side of the floater or "debiteuse" in the last of the drawing chambers, notwithstanding said molten glass has previously passed through another or plurality of drawing chambers.

Fourth, to construct a glass furnace of the character indicated in which a separate and independent heating chamber is provided at each end of the drawing tank, said heating chamber adapted to so co-operate with its end or last drawing chamber as to fully control the heating or revitalizing of the molten glass in said end or last drawing chamber and insure the molten glass in the last or end drawing chamber to be of uniform texture and temperature and proper fluidity to the extreme bottom or lowest portion, width and length of the last drawing chamber, whereby the molten glass passing in the floater or "debiteuse" of the last drawing chamber is not in any way chilled, stale, or vitrified and capable of being properly drawn into a sheet of glass having as uniform a texture, color, high lustre and brilliancy as is produced from the other drawing chambers.

Fifth, to so construct a glass furnace of the character indicated in which the parts are so arranged that after the raw materials have been thoroughly mixed and in a highly heated or fused condition in the melting furnace, the heated or fused glass is capable of passing through specially constructed and arranged chambers to properly temper or reheat said heated glass before entering the floater or "debiteuse" in the several drawing chambers of the drawing tank or tanks and withdrawn therefrom by the mechanical sheet glass drawing machines.

Sixth, other objects and advantages of the improved glass furnace will appear from the detailed description of the construction and arrangement of the parts and mode of operation to be hereinafter given.

The invention consists of structural characteristics and relative arrangements of elements which will be hereinafter more fully described and particularly pointed out in the appended claims.

In the drawings in which similar reference characters indicate the same parts in the several figures, Figure 1 is a top plan view of the furnace partly broken away or in section, and Figure 2 is an enlarged sectional view taken on line II—II of Figure 1.

Referring to the drawings, 10 is the primary or melting furnace located at one end while at the other end is formed or provided an elongated and narrow drawing tank 11, which is subdivided into a series or plurality of alternately arranged reheating chambers 12 and drawing chambers 13 and 14, as clearly shown in Fig. 2, said reheating chambers 12 and drawing chambers 13 and 14 are separated by walls 15 having openings 16 at their bottom sections to place the adjacent reheating chambers 12 and drawings chambers 13 and 14 in communication with each other at their lower portions and permit the molten glass to pass or progressively flow from the melting furnace 10 through the drawing chambers 13 and reheating chambers 12 to the outer or end drawing chambers 14—14 which are the last chambers in the path of the flow of the molten glass, and the outer reheating wall 151 of each end drawing chamber 14 is imperforate in order to retain the molten glass within said drawing chamber 14 and said wall 151 extends to the bottom of said chamber 14 to permit the reheating or revitalizing of the lowest strata of molten glass in the end drawing chamber 14 for purpose to be presently described.

Each of said drawing chambers 13 and 14 is provided with a supplying float or "debiteuse" 17, as shown for example, in U. S. Patent No. 839,822 to Fourcault, dated Dec. 4, 1906, or preferably of a type as described in my recently allowed U. S. application filed August 2, 1922, Serial Number 729,783, said floats or "debiteuse" 17 being so arranged and disposed to properly feed the molten glass to the several sheet glass drawing machines 18, 18, supported on the walls or arches 15, 15, which draw the continuous sheet glass sections 19, 19, as illustrated in Fig. 2, said drawing machines 18, 18, are preferably of the construction disclosed in said Fourcault's U. S. Patent No. 837,821 and form no part of the present invention.

At each end of the drawing tank 11 and arranged in juxtaposition or adjacent to each of said end drawing chambers 14, 14, is provided a separate and independent heating chamber 20 which is disconnected from the melting and drawing tanks and so constructed and arranged to confine highly heated gases whose temperature is under absolute control and adapted to convey said controlled heat to and through the full width and depth of the end wall 151 and in turn reheat or revitalize the partially chilled or cooled lower strata of molten glass within said end drawing chamber 14 after having previously passed from the melting furnace 10, along the bottoms of the drawing chambers 13 and 14 and reheating chambers 12.

The melting furnace 10 and drawing tank 11 are preferably separated and connected by a cooling, tempering or reheating passageway 21, said passageway 21 communicating with the drawing tank 11 substantially at its middle portion, as shown in Fig. 1 if so desired.

The front end of the melting furnace is provided with the usual charging opening 22 for the introduction of the raw materials or batch used to produce the glass, while the rear end of said melting furnace 10 is arranged with a floater 23 to skim or prevent any impurities on the surface of the molten glass from passing into the passageway 21, said floater 23 being a common expedient in glass furnaces and needs no further explanation. 24 is a floater so located and arranged for skimming and removing any impurities from the cooled or tempered molten glass before the same enters the drawing tank 11, and while I prefer to use and arrange said floaters 23 and 24 as shown and described, the same may be omitted or other expedients for this purpose may be substituted.

The melting furnace 10 is also provided with the usual gas and air mixing chambers 25, 25, arranged on each side of the furnace 10 as shown, said mixing chambers being connected with well known regenerators, and gas is supplied from the mains 26, 26, and distributed or supplied by the branch pipes 27, 28 having valves 29 for controlling the mixture of gas and air passing through the openings 30, 30 and burned within the melting furnace 10 said generator construction and disposition of gas and air chambers 25 with connected regenerators for supplying the necessary fuel and heated air to the melting furnace 10 may be varied in many ways, as will be readily understood, and while I prefer to employ the arrangement herein illustrated, and shown and disclosed in my former U. S. Patent No. 1,130,536, dated Mar. 2, 1915, the same may be varied to suit the particular locality and conditions under which the furnace is to be operated.

The tempering or reheating passageway 21 may be provided with suitable air and gas chambers 31, 31, and the reheating chambers 12, 12 of the tank 11 and end independent heating chambers 20, 20 with air and gas chambers 32, 32, similar to and smaller than the chambers 25, 25, used in connection with melting furnace 10 and arranged to receive their supply of gas, as shown in Fig. 1, from the mains 33, 33, by means of branch pipes 34, 35 having connecting pipes 36 or 37 provided with valves 38 and 39 for controlling the supply of gas into said chambers 31 and 32, as will be readily understood and for purposes to be presently described.

The parts of the furnace being constructed and arranged as disclosed, the manner in which the same operate is as follows:

After the melting or primary furnace 10 has been properly heated up, and the various raw materials introduced therein through the charging opening 22 have been thoroughly mixed and fused into molten glass of the proper temperature, fluidity and homogeneity, said glass passes under the floater 23 into the tempering or cooling conduit or passageway 21 and progressively flows under the floater 24 into the right and left branches of the drawing tank 11. Said molten glass then first passes into the drawing chambers 13, 13, then through the reheating chambers 12, 12 and finally into the end or last drawing chambers 14, 14. As said molten glass passes through the floater or "debiteuse" in said drawing chambers 13 and 14 the molten glass is drawn up by the drawing machines 18, 18, into sheets 19, 19, as shown in Fig. 2, and more particularly described in U. S. Patent No. 837,821, to Fourcault, and needs no further disclosure and forms no part of the present invention.

As the molten glass moves from the melting furnace 10 through the tempering conduit or passageway 21 and through the drawing tank 11 into the several drawing chambers 13 and 14 and reheating chambers 12, the bottom strata or lowest portion of the molten glass is cooled and loses its heat faster than the intermediate and top strata or portions, owing to it moving more slowly and coming in contact with the bottom fire brick, and said lowest portion or strata of the moving molten glass cannot be reheated in the reheating chambers 12, 12, without unnecessarily and dangerously increasing the temperature and destroying the proper drawing qualities of the top portion or strata of the molten glass in said reheating chambers and passing into the floaters or "debiteuse" in the drawing chambers 14, 14. As said intermediate or bottom portions or strata of the molten glass arrive at the heating wall 151 they gradually and properly take up the stored up heat in said wall 151 and maintained by the heating chamber 20, and the layers of the molten glass throughout the last drawing chambers 14, 14, will be therefore reheated and entirely revitalized to their proper temperatures and original fluidity and drawing qualities with which they entered the drawing tank 11 and chamber 13, in order to produce sheets of glass of high lustre, brilliancy, and uniform and homogeneous texture throughout the entire battery of drawing machines operating from the series of drawing chambers.

From the foregoing disclosure of the construction and operation of the invention, it will be seen that the temperatures and differences of the temperatures of the upper, intermediate and lowest layers or strata of the moving molten glass at the point where said glass initially leaves the melting tank 10 or tempering passageway 21 and enters the drawing tank 11, and the differences of the temperatures of the layers or strata at intermediate points, and more specially at the last drawing chamber 14 have been eliminated by means of the heat conveyed and radiated by the heating wall 151 and maintained by the heating chamber 20, and said chamber 20 comprises a most important, reliable, compact and easily installed adjunct to the furnace structure, and all the objects and advantages recited in the statement of invention have been fully and efficiently carried out by said heating chamber 20, and while I have shown and described the preferred form of the same, it will be readily understood that many changes or variations of said chamber 20 will readily suggest themselves without in any way departing from the present invention or evading the scope of the claims.

It will also be readily understood that molten glass may be supplied to or melted in the heating chamber 20, if so desired and as shown for example in the heating chamber at the left end of Fig. 2. Said molten glass remaining in said chamber 20 and not being drawn into sheets or capable of flowing into any of the drawing chambers 13 or 14, thus enabling said molten glass in said chamber 20 to not only act as a brace or retainer to the heating wall 151 to equalize the pressure of the molten glass in the drawing chamber 14 on the other side of said wall 151, but also to uniformly and completely distribute the heat in the heating chamber 20 to all parts of the wall 151.

What I claim is:

1. A glass furnace for drawing continuous sheets of glass, comprising a melting furnace, a drawing tank communicating with said melting furnace and divided into a series of alternating drawing and reheating chambers in communication with each other and the melting furnace, and terminating with a drawing chamber, a separate and independent heating chamber adjacent to the end drawing chamber and not in communication with said drawing tank or melting furnace to revitalize the chilled molten glass passing into the end drawing chamber.

2. A glass furnace for drawing continuous sheets of glass, comprising a melting furnace, a drawing tank communicating with said melting furnace and divided into a series of alternating drawing and reheating chambers and terminating with a drawing chamber, a separate and independent heating chamber adjacent to the end drawing chamber and not in communication with said drawing tank or melting furnace to revitalize the chilled molten glass passing into the end drawing chamber and walls separating the reheating and drawing chambers and having openings permitting the molten glass to pass from the melting furnace to the drawing chambers through said reheating chambers.

3. A glass furnace for drawing continuous sheets of glass, comprising a melting furnace, an elongated drawing tank communicating substantially at is middle portion with said melting furnace and divided into a series of alternating drawing and reheating chambers in communication with each other and the melting furnace and terminating at each of its ends with a drawing chamber, a separate and independent heating chamber at each end of said drawing tank and adjacent to the end drawing chamber and not in communication with said drawing tank or melting furnace to revitalize the chilled molten glass passing into the end drawing chambers.

4. A glass furnace for drawing continuous sheets of glass, comprising a melting furnace, a tempering conduit or passageway connected to said melting furnace, a drawing tank communicating with said tempering conduit and divided into a series of alternating drawing and reheating chambers in communication with each other and the tempering conduit and terminating at each of its ends with a drawing tank, a separate and independent heating chamber at each end of said drawing tank and adjacent to the end drawing chamber and not in communication with said drawing tank or tempering conduit to revitalize the chilled molten glass passing into the end drawing chambers.

5. A glass furnace for drawing continuous sheets of glass, comprising a melting furnace, a tempering conduit or passageway connected to said melting furnace, an elongated straight drawing tank communicating substantially at its middle portion with said tempering conduit and divided into a series of alternating drawing and reheating chambers in communication with each other and the melting furnace and terminating at each of its ends with a drawing chamber, a separate and independent heating chamber at each end of said drawing tank and adjacent to the end chamber and not in communication with said drawing tank or tempering conduit to revitalize the chilled molten glass passing into the end drawing chambers.

6. A glass furnace for drawing continuous sheets of glass, comprising a melting furnace, a drawing tank communicating with said melting furnace and divided into a series of alternating drawing and reheating chambers in communication with each other and the melting furnace and terminating with a drawing chamber having an outer heating wall, and a separate and independent heating chamber adjacent to and adapted to heat said heating wall and not in communication with said drawing tank.

In testimony whereof, I hereunto affix my signature.

JULES J. QUERTINMONT.